United States Patent [19]

Wine

[11] Patent Number: 4,543,563
[45] Date of Patent: Sep. 24, 1985

[54] MECHANICALLY-ACTUATED TRANSPARENT TOUCHBARS AND TOUCHPLATES

[75] Inventor: Charles M. Wine, Princeton, N.J.

[73] Assignee: RCA Corporation, Princeton, N.J.

[21] Appl. No.: 410,485

[22] Filed: Aug. 23, 1982

[51] Int. Cl.[4] .............................................. G08C 9/00
[52] U.S. Cl. ................................. 340/365 S; 200/5 A; 340/365 R; 400/100; 400/489
[58] Field of Search .................... 200/5 A; 340/365 R, 340/365 S, 365 A, 365 P; 400/87, 88, 100, 101, 102, 472, 486, 489, 121; 179/90 K

[56] References Cited

U.S. PATENT DOCUMENTS

| | | |
|---|---|---|
| 3,312,892 | 4/1967 | Parnes . |
| 3,495,232 | 2/1970 | Wagner ............................ 340/365 R |
| 3,702,957 | 11/1972 | Wolfendale . |
| 4,029,915 | 6/1977 | Ojima ................................. 200/5 A |
| 4,103,252 | 7/1978 | Bobick ................................... 331/48 |
| 4,118,611 | 10/1978 | Harris ................................... 200/674 |
| 4,177,421 | 12/1979 | Thornburg ........................ 324/61 R |
| 4,246,452 | 1/1981 | Chandler ............................ 200/5 A |
| 4,400,593 | 8/1983 | Kunz .................................. 200/5 A |
| 4,440,515 | 4/1984 | Nassimbene .................... 340/365 R |

FOREIGN PATENT DOCUMENTS

| | | |
|---|---|---|
| 0033910 | 8/1981 | European Pat. Off. . |
| 1492538 | 11/1977 | United Kingdom ............ 340/365 R |
| 1552753 | 9/1979 | United Kingdom . |
| 2048531 | 12/1980 | United Kingdom . |

Primary Examiner—John W. Caldwell, Sr.
Assistant Examiner—Michael F. Heim
Attorney, Agent, or Firm—Joseph S. Tripoli; George E. Haas; Allen LeRoy Limberg

[57] ABSTRACT

A transparent touchbar or touchplate is supported at its edges by a plurality of push-button switches. A plurality of valid touchpoints exist; and the touching of each can be distinguished, though the number of touchpoints is larger than the number of pushbuttons. This is done by logically combining the responses to the push-button switch closures occasioned by the application of force to any one of the valid touchpoints.

11 Claims, 7 Drawing Figures

MECHANICALLY-ACTUATED TRANSPARENT TOUCHBARS AND TOUCHPLATES

The present invention relates to mechanically actuated transparent touchbar or touchplate apparatus useful, by way of illustration, in electronic game apparatus.

In certain electronic games or computer-user interface applications it is desirable to have a transparent touchbar or touchplate overlaid on the viewscreen of a kinescope or a light-emitting-device display, a liquid-crystal-device display, or the like. It is desirable that this touchbar or touchplate have on it a plurality of valid touchpoints which the viewer-user can selectively apply force to for supplying input to the gaming or computing apparatus. Low cost is essential or desirable for such touchbar or touchplate apparatus.

The invention is embodied in transparent touchbar or touchplate apparatus where the touchpoint a user applies force to is indicated by the closure or non-closure of the contacts of force-sensitive or pressure-sensitive switches at the edges of an array of valid touchpoints. The switches, being on the edges of the array, do not interfere with viewing through the transparent touchbar or touchplate.

In the drawing:

FIGS. 1a, 1b, 1c, and 1d are sketches of four possible conditions encountered in a transparent touchbar apparatus embodying the present invention and using normally-open switches;

Figure 1A:
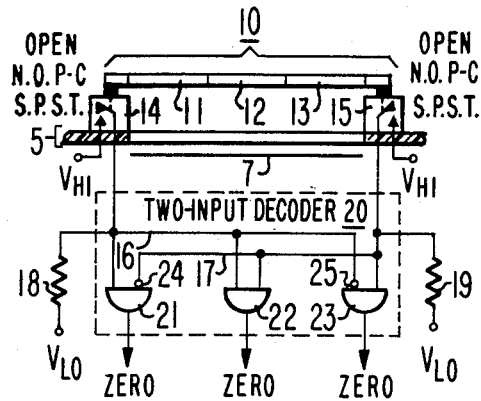

FIGS. 1(a), 1(b), 1(c) and 1(d) show in profile a rigid touchbar 10 divided along its length into a left section 11, a middle section 12 and a right section 13. Touchbar 10 is supported at its left end by a normally-open single-pole-single-throw push-button switch 14, and at its right end by a normally-open single-pole-single-throw push-button switch 15. Touchbar 10 is made of transparent material, such as a clear plastic, and the mounting plate 5 (shown in cross-section) on which switches 14 and 15 are mounted has a hole in it between the switches so an underlying screen 7 (shown in profile) may be viewed through the touchplate and the hole. Alternatively, screen 7 may be on top of plate 5 and the hole in plate 5, omitted. It is convenient to use printed-circuit (p-c) switches for switches 14 and 15 and to make plate 5 the printed circuit board for receiving them. A high level voltage ($V_{HI}$) or logic ONE level is provided to one terminal of switches 14 and 15.

Switch 14, when closed in response to user-applied downward force 8 on touchbar 10, applies the high level voltage $V_{HI}$ to interconnection bus 16 to lift the bus voltage from logic ZERO to logic ONE condition. Switch 15, when closed in response to user-applied downward force 8 on touchbar 10, applies the high level voltage $V_{HI}$ to interconnection bus 17 to lift the bus voltage from logic ZERO to logic ONE condition. Resistances 18 and 19 connect busses 16 and 17 to a low level voltage $V_{LO}$ to pull down the bus voltages to logic ZERO when logic ONE is not applied from a comparatively low source resistance by closure of switch 14 or 15. The push buttons of switches 14 and 15 can be joined by a flexible cement to touchplate 10 at the points they are to support. Providing switches 14 and 15 have sufficient side-play in their closing action, the cement need not be flexible. A two-input decoder 20—comprising AND gates 21, 22, and 23 and logic inverters 24 and 25, for example —supplies output lines corresponding to sections 11, 12, and 13. A logic ONE appears on the one of these lines corresponding to the one of the sections 11, 12 and 13 to which a user applies sufficiently large downward force.

In FIG. 1(a) touchbar 10 does not have applied to it any downward force sufficiently large to close either switch 14 or switch 15. Busses 16 and 17 are both at logic ZERO. AND gates 21, 22, and 23 all have at least one ZERO input from these busses. So the output signals of each of these gates is a ZERO.

Figure 1B:
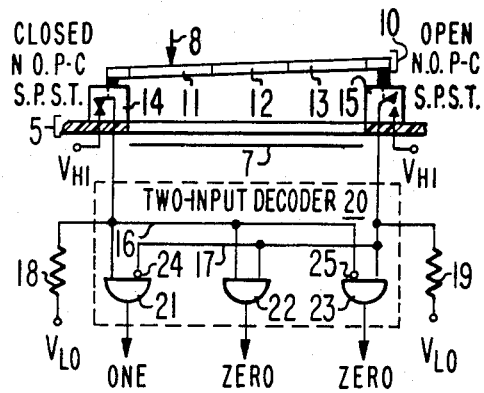

In FIG. 1(b) the left section 11 of touchbar 10 has sufficient downward force 8 applied on it by a user to close normally-open push-button switch 14. When further rotation of touchbar 10 is restrained, there must be equality between the clockwise and counterclockwise first moments around the point of application of force by the user, so the respective upward forces exerted by push-button switches 14 and 15 to oppose user-applied downward force 8 have to be in inverse proportion to their distance from the point of application of that downward force. The substantially shorter distance of switch 14 from point of application of downward force resolves most of that force for application to its push-button and provides for closure of switch 14, while leaving switch 15 open. Bus 16 has a ONE applied to it, while bus 17 remains at ZERO. This ZERO is inverted to ONE by inverter 24 and the resultant ONE is applied to one of the inputs of AND gate 21, the other of which receives a ONE from bus 16. The output of AND gate 21 goes to ONE responsive to both its inputs being ONEs and indicates user-applied force 8 being applied on the left seciton 11 of touchbar 10.

AND gate 22 supplies an output ZERO responsive to ONE input from bus 16 and ZERO input from bus 17. Inverter 25 inverts the ONE on bus 16 to apply a ZERO as input to AND gate 23, as well as it receiving an input ZERO from bus 17. AND gate 23 responds with an output ZERO.

Figure 1C:
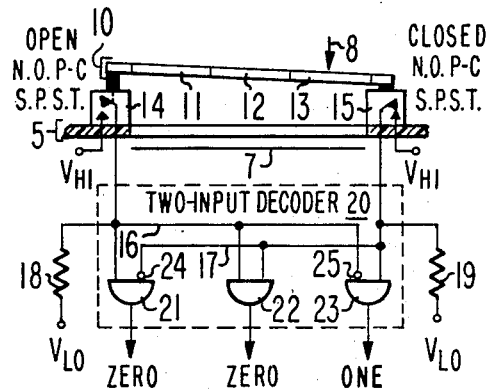

In FIG. 1(c) the right section 13 of touchbar 10 has sufficient downward force 8 applied on it by a user to close normally-open push-button switch 15. Operation analogous to that described with respect to FIG. 1(b) results in AND gates 21 and 22 having ZERO output signals and in AND gate 23 having a ONE output signal.

Figure 1D:
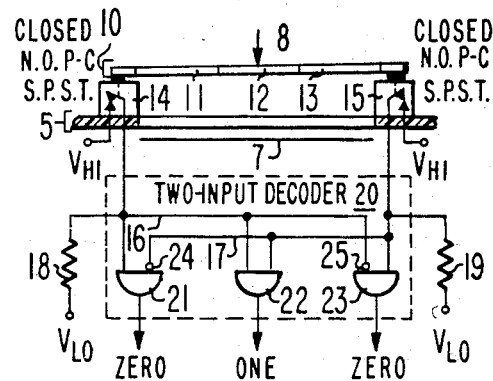

FIG. 1(d) shows the touchplate 10 receiving applied downward force 8 in its middle section 12. This force is resolved equally into forces on each of the normally-open push-button switches 14 and 15, closing them to apply ONEs to both the busses 16 and 17. AND gates 21 and 23 receive input ONEs directly from respective ones of busses 16 and 17, and these AND gates receive input ZEROs from the outputs of inverters 24 and 25 responsive to the input ONEs they receive from respective ones of the busses 16 and 17. AND gates 21 and 23 respond to these inputs with output ZEROs, while AND gate 22 responds with output ONE to input ONEs received from busses 16 and 17.

Figure 2:
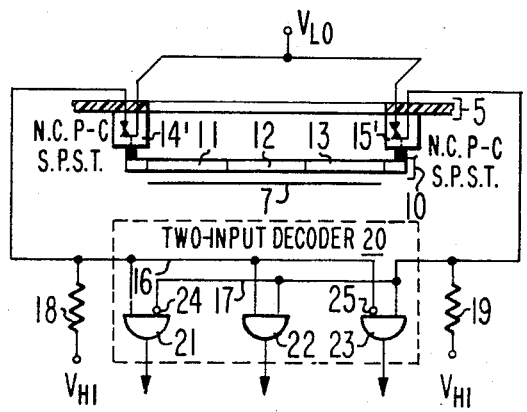
FIG. 2 is a sketch of a transparent touchbar apparatus embodying the present invention and using normally-closed switches.

FIG. 2 shows how the touchbar 10 may be mounted to use normally-closed single-pole-single-throw push-button switches 14' and 15', rather than normally-open switches 14 and 15. The hole in mounting plate 5 permits the user to touch the top of touchplate 10 to open switch 14' with sufficient force on left section 11, to open switch 15' with sufficient force on right section 13, or to open both switches with sufficient force on middle section 12. Resistors 18 and 19 return busses 16 and 17 to a logic ONE supply voltage rather than a logic ZERO supply voltage, and the switches 14' and 15' in their normally closed positions short-circuit busses 16 and 17 respectively to a logic ZERO supply voltage.

The transparent touchbar arrangements of FIGS. 1 and 2 provide distinct responses to three touchpoint regions using only two push-button switches, rather than three; and there is no switch to impede viewing a display screen through the touchbar. In a touchplate arrangement the touchpoint resolution scheme can be employed in each of two orthogonal dimensions in the plane of the touchplate, and the saving in push-button switches afforded by the invention becomes more impressive. Four push-button switches and associated logic can generate nine distinct responses to pressure on nine different touchpoints arranged in a rectangular array of three rows and three columns. This type of transparent touchplate is useful in computer terminals for permitting the operator to select amongst nine alternatives presented to him by the computer on its graphic display cathode-ray-tube, for example. This type of transparent touchplate is useful as the user interface in an electronic tic-tac-toe game using an underlying liquid-crystal-display (LCD); as another example.

Figure 3:
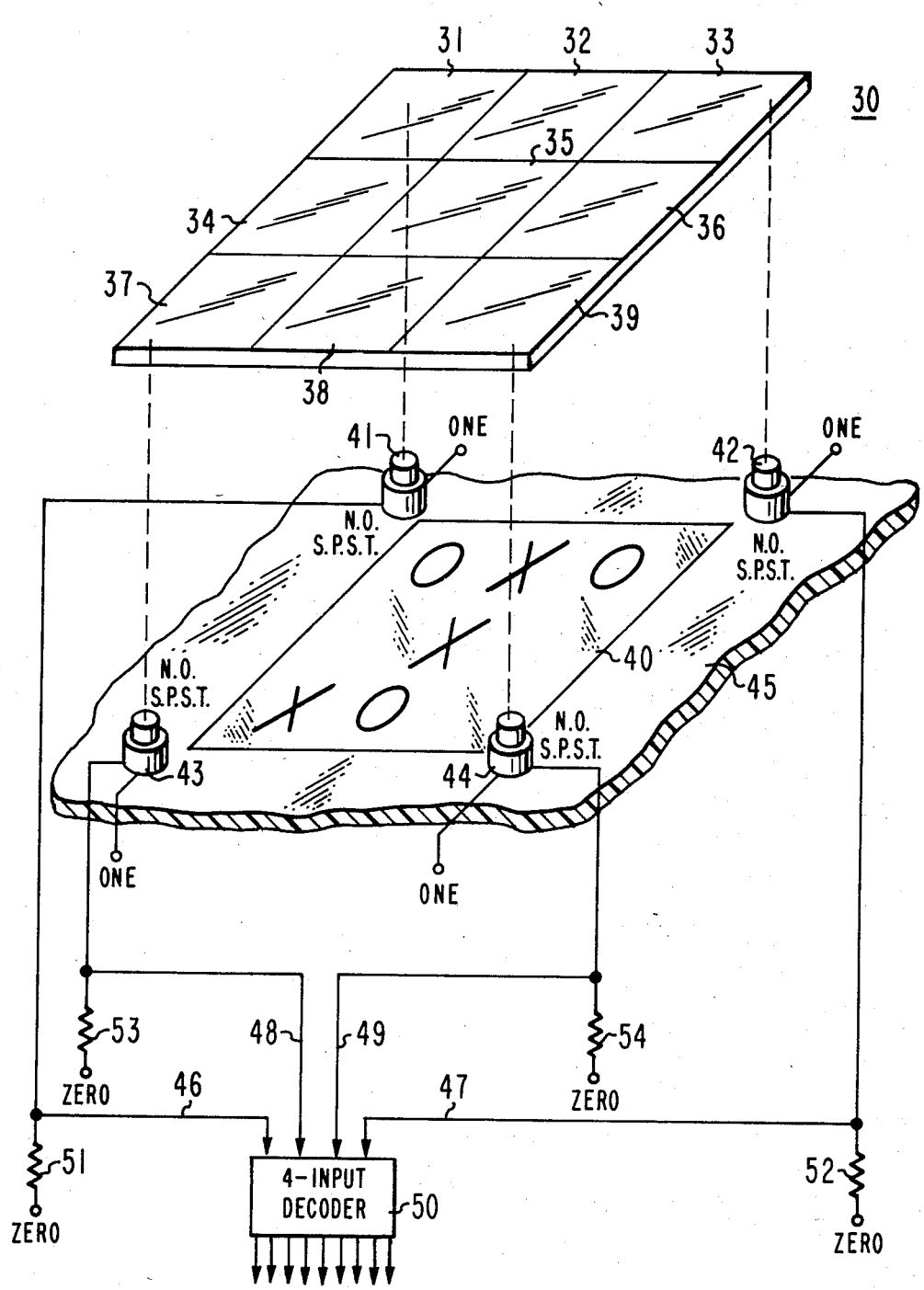
FIG. 3 is an exploded view of a transparent touchplate apparatus embodying the present invention and using normally-open switches.

FIG. 3 shows in exploded view how a rectangular transparent touchplate 30 with an array of valid touchpoints 31–39 thereon can be used to overlay a correspondingly rectangular screen 40 (e.g. that of an LCD for displaying tic-tac-toe circles and crosses). A plurality of four normally-open single-pole-single-throw push-button switches 41–44 support the corners of touchplate 30, their buttons being glued thereto with a flexible cement. Switches 41–44 are supported by a support member 45 surrounding screen 40. In practice, it is easiest to use switches 41–44 designed for printed circuit boards and to use the printed circuit board as supporting member 45. The metallization on the p-c board is exposed as wiring in the exploded view of FIG. 3 for ease of illustration. When closed in response to user-applied force, switches 41, 42, 43 and 44 respectively clamp busses 46, 47, 48 and 49 to logic ONE voltage. Busses 46, 47, 48 and 49 supplying input signals to a four-input decoder 50 are otherwise held to logic ZERO voltage by resistances 51, 52, 53 and 54, respectively.

Decoder 50 is typically a four-input, 16-output decoder, nine of the outputs of which are usually used in touchplate apparatus embodying the invention. The CMOS-logic CD4514B manufactured by the Solid State Division of RCA Corporation at Somerville, NJ, is a suitable decoder of this type. The decoder is arranged to provide the nine outputs in accordance with the following truth table, no output indication being provided for the non-touch and non-valid conditions.

| SWITCHES CLOSED | | | | |
|---|---|---|---|---|
| 41 | 42 | 43 | 44 | AREA TOUCHED |
| 0 | 0 | 0 | 0 | NONE |
| 0 | 0 | 0 | 1 | 39 |
| 0 | 0 | 1 | 0 | 37 |
| 0 | 0 | 1 | 1 | 38 |
| 0 | 1 | 0 | 0 | 33 |
| 0 | 1 | 0 | 1 | 36 |
| 0 | 1 | 1 | 0 | NON-VALID |
| 0 | 1 | 1 | 1 | NON-VALID |
| 1 | 0 | 0 | 0 | 31 |
| 1 | 0 | 0 | 1 | NON-VALID |
| 1 | 0 | 1 | 0 | 34 |
| 1 | 0 | 1 | 1 | NON-VALID |
| 1 | 1 | 0 | 0 | 32 |
| 1 | 1 | 0 | 1 | NON-VALID |
| 1 | 1 | 1 | 0 | NON-VALID |
| 1 | 1 | 1 | 1 | 35 |

The sixteen binary numbers established by the pattern of switch closure can be those enumerating the outputs of a sixteen-output, four-input decoder 50. The four outputs with three bit places being logic ONE are not normally used, nor are the two outputs with two bit places being logic ONE as generated by closure of diagonally opposite ones of switches, nor is the all ZERO output. These seven outputs may be OR'ed to generate feedback to the user, through aural, visual or tactile means that a valid selection of touchpoint has yet to be made.

Alternatively, the non-valid switch conditions (particularly those where three ONEs and a ZERO are generated) may be decoded and OR'ed with all-ONEs condition to indicate touching of the central touchpoint 35. The non-valid conditions never obtain, except on a transient basis, provided touchplate 10 is flat and rigid. Transparent plastic plates, particularly thinner ones, are subject to bending and warpage which may interfere with all four switches closing at once; if this is expected to occur, the alternative decoder algorithms are preferable to use.

Figure 4:
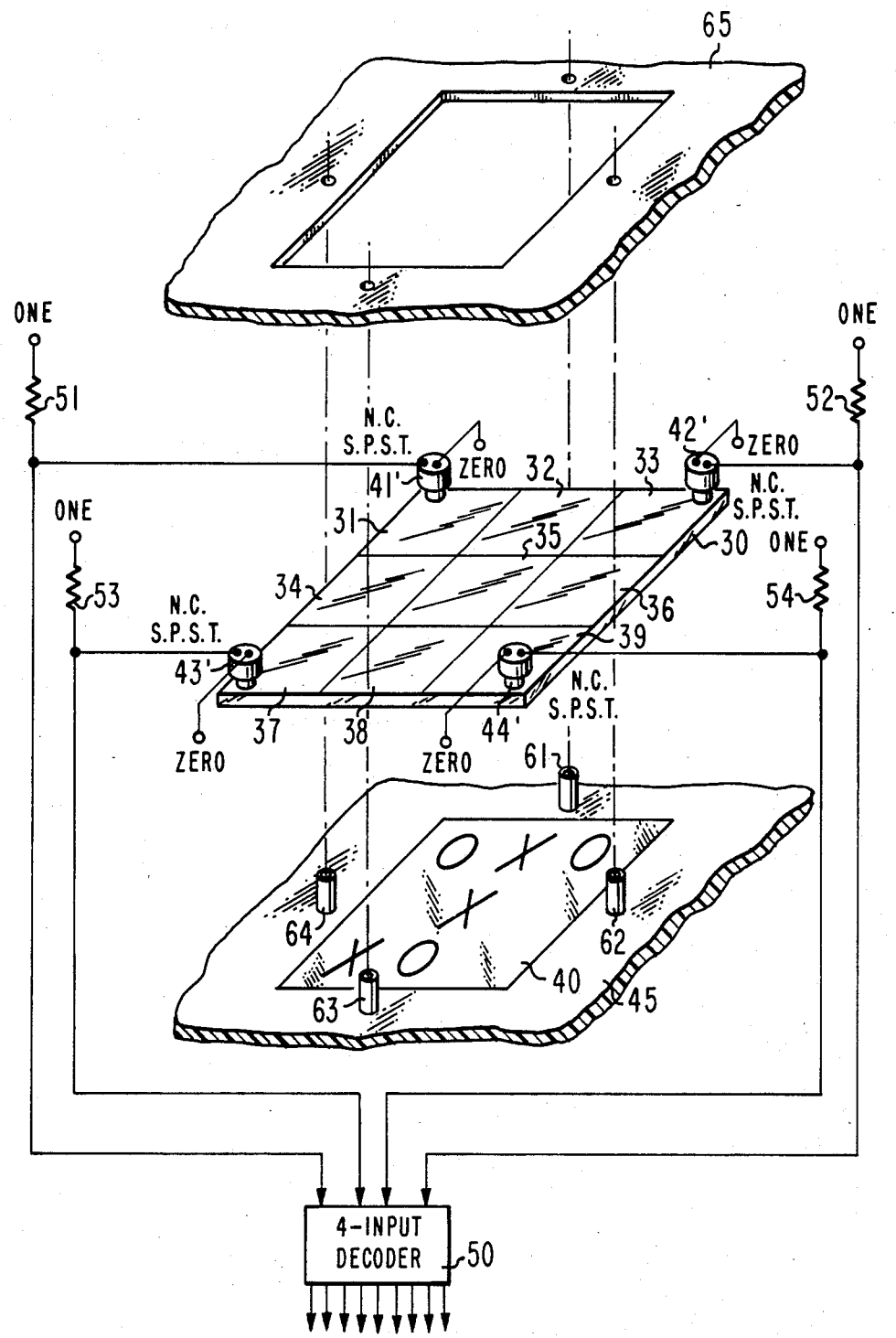
FIG. 4 is an exploded view of a touchplate apparatus embodying the present invention and using normally-closed switches.

FIG. 4 shows the modification necessary to use normally-closed single-pole-single-throw push-button switches 41', 42', 43' and 44' instead of normally-open switches 41, 42, 43 and 44. Switches 41', 42', 43', and 44' have their backs mounted on a bezel plate 65 offset from support member 45 by means such as pins 61–64. The output is sufficiently large to accommodate switches 41'–44' and touchplate 10. Pins 61–64 may be drilled and tapped, and machine screws (not shown) may be threaded through corresponding holes in bezel plate 65 into the tapped holes to hold the plate in place. Or bezel plate 65 may be glued to the tops of pins 61–64.

Rather than using single-pole-single-throw push-button switches with pull-up or pull-down resistors to develop logic ZERO and logic ONE conditions, single-pole-double-throw push-button switches can be used to select between logic ZERO and logic ONE conditions.

Touchplates embodying the invention (e.g. as described in connection with FIG. 2) may be arranged alongside touchbars embodying the invention (e.g. as described in connection with FIG. 1) or other such touchbars to obtain three-column arrays of valid touchpoints which have more than three rows. The principles of the invention maybe useful in certain applications where the touchbar or touchplate is made of non-transparent material or is only transparent in part. It will be appreciated that the decoding function may advantageously be performed in a microcomputer or other means than that shown.

Steps may be taken in the microcomputer to suppress transient switch response conditions, by requiring that a touch be sustained for a predetermined time interval to be considered valid. Standard contact-debouncing circuitry may be used with decoder 20, for suppressing transient switch response conditions; for example, small capacitors can parallel resistors 18, 19 or 51, 52, 53, 54 to integrate switch response slightly.

What is claimed is:

1. In combination:

a touchplate having first and second opposite surfaces, the first surface having thereon a row and column array of touchpoints;

a supporting surface;

first, second, third and fourth push-button switches between said supporting surface and first, second, third and fourth support points on the second surface of said touchplate substantially opposite the first, second, third and fourth corners respectively of said row and column array of touchpoints, each of said push-button switches having at least one pair of force-actuated contacts associated therewith having a normal condition and having an alternative condition;

means responsive to the pair of force-actuated contacts of at least one of said first, second, third and fourth push-button switches being displaced from said normal condition to said alternative condition in response to user-applied force on said touchplate, for generating indications concerning to which one of said touchpoints said force is applied; and means, included within said means for generating indications for responding to the contacts of at least two of said first, second, third and fourth push-button switches being simultaneously displaced from said normal condition to generate an indication of said force being applied to a touchpoint between touchpoints opposite those push-button switches.

2. In combination:

a touchplate having first and second opposite surfaces, the first surface having thereon a row and column array of touchpoints;

a supporting surface having a hole therein of a shape for surrounding the edges of said array of touchpoints;

first, second, third and fourth push-button switches between said supporting surface and first, second, third and fourth support points on said touchplate first surface and at or near first, second, third and fourth corners of said row and column array of touchpoints, each of said push-button switches having at least one pair of force actuated contacts having a normal condition and an alternative condition associated therewith;

means for applying bias forces to positions on the second surface opposite to said support points, for displacing said pairs of force-actuated contacts of said first, second, third and fourth push-button switches from their normal conditions to their alternative conditions;

means responsive to at least one of said first, second, third and fourth push-button switches being placed into its normal condition in response to user-applied force on said touchplate overcoming bias force, for generating indications concerning to which one of said touchpoints said force is applied; and means, included within said means for generating indications, for responding to the contacts of at least two of said first, second, third and fourth push-button switches being simultaneously placed into said normal condition to generate an indication of said force being applied to a touchpoint between touchpoints at or near those push-button switches.

3. A combination as set forth in claim 1 or 2 wherein said array has nine touchpoints arrayed in three columns and three rows and wherein said means for generating indications comprises a four-input decoder receiving each of its inputs from a different one of said first, second, third and fourth push-button switches.

4. A combination as set forth in claim 2 wherein said first, second, third and fourth push-button switches are each of normally-open, single-throw type.

, 5. A combination as set forth in claim 2 wherein said first, second, third and fourth push-button switches are each of normally-closed, single-throw type.

6. In the combination of:

a touchplate having first and second opposing surfaces, the first surface having nine touchpoints arrayed in three columns and three rows thereon;

a supporting surface;

first, second, third and fourth force-responsive switch means between said supporting surface and first, second, third and fourth support points on one of the surfaces of said touchplate at or near the first, second, third and fourth corners of said row and column array of touchpoints, each of said switch means having at least one pair of force-actuated contacts associated therewith; and means responsive to the pairs of contacts of said first, second, third and fourth switch means being displaced from their normal conditions in response to user-applied force on said touchplate for generating indications concerning which one if any of said touchpoints sufficient force is applied to by a user—the improvement wherein said means for generating indications comprises a four-input decoder that is of a type:

receiving each of its inputs from a pair of contacts associated with a different one of said first, second, third and fourth force-sensitive switch means;

responding to the contacts of said first, second, third and fourth switch means all being in their normal conditions for providing indication of no touchpoint being selected;

providing respective indications that the selected touchpoint is nearby one of the corners of said array in response to the contacts of only the one of the first, second, third and fourth switch means at the corresponding support point being displaced from normal condition, while the others remain in normal condition;

providing respective indications that the selected touchpoint is near the middle of any one of the sides of said rectangular array in response to the contacts of only the pair of switch means touching the support points at or near the corners at the ends of that side being displaced from normal condition, while the others remain in normal condition; and providing an indication that said touchpoint is near the center of said rectangular array in response to the contacts of all of said first, second, third and fourth switch means being displaced from normal conditions.

7. A combination as set forth in claim 1, 3, or 6 wherein said touchplate is transparent and wherein a viewscreen is arranged to be viewed through said touchplate by its user.

8. In the combination of:
- a touchbar having first and second opposite surfaces, the first surface having a linear array of first, second and third touchpoints thereon and one of the surfaces having first and second support points thereon at or near the first and third touchpoints, said first and third touchpoints being at the extremities of said linear array, and said second touchpoint being in the middle of said linear array;
- a supporting surface;
- first and second force-responsive switch means between said supporting surface and said first and second support points respectively, each of said first and second switch means having at least one pair of force-actuated contacts associated therewith; and
- means responding to each pair of contact being displaced from their normal conditions by user-applied force on said touchbar, as resolved between said first and second switch means, for generating indications concerning to which one if any of said touchpoints sufficient force is applied to by user—the improvement wherein said means for generating indications comprises a two-input decoder that is of a type:
  - receiving each of its inputs from a pair of contacts associated with a different one of said first and second force-sensitive switch means;
  - responding to the contacts of said first and second switch means both being in their normal conditions to indicate no valid touchpoint selection;
  - providing respective indications that the selected touchpoint is nearby one of the ends of said linear array in response to the contacts of only the one of the first and second switch means touching the support point at that end being displaced from normal condition, while the other remains in normal condition; and
  - providing respective indications that the selected touchpoint is near the middle of said linear array in response to the contacts of both pairs of switch means being displaced from normal condition.

9. A combination as set forth in claim 8 wherein said touchbar is transparent and wherein a viewscreen is arranged to be viewed through said touchbar by its user.

10. A combination as set forth in claim 6 or 8 wherein the normal condition of the contacts of each said switch means is open, and said support points are on said second surface.

11. A combination as set forth in claim 6 or 8 wherein the normal condition of the contacts of each said switch means is closed, and said support points are on said first surface.

* * * * *